US008225367B2

(12) United States Patent
Ludvig et al.

(10) Patent No.: US 8,225,367 B2
(45) Date of Patent: Jul. 17, 2012

(54) SYSTEMS AND METHODS FOR DYNAMIC CONVERSION OF WEB CONTENT TO AN INTERACTIVE WALLED GARDEN PROGRAM

(75) Inventors: Edward A. Ludvig, Redwood City, CA (US); Jay D. Logue, San Jose, CA (US); Steven R. Sandke, Cupertino, CA (US); Brian K. Feinberg, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 12/023,875

(22) Filed: Jan. 31, 2008

(65) Prior Publication Data

US 2008/0141325 A1 Jun. 12, 2008

Related U.S. Application Data

(62) Division of application No. 10/262,325, filed on Sep. 30, 2002, now abandoned.

(51) Int. Cl.
*H04N 7/173* (2011.01)
(52) U.S. Cl. ......... 725/114; 725/110; 725/115; 725/116
(58) Field of Classification Search .............. 725/93–97, 725/114–116, 110
See application file for complete search history.

(56) References Cited

U.S. PATENT DOCUMENTS

| | | | |
|---|---|---|---|
| 5,961,603 A * | 10/1999 | Kunkel et al. ................. | 709/229 |
| 5,982,445 A * | 11/1999 | Eyer et al. ..................... | 348/461 |
| 6,047,317 A * | 4/2000 | Bisdikian et al. ............. | 725/142 |
| 6,185,625 B1 * | 2/2001 | Tso et al. ....................... | 709/247 |
| 6,188,428 B1 | 2/2001 | Koz et al. | |
| 6,215,483 B1 | 4/2001 | Zigmond | |
| 6,275,989 B1 * | 8/2001 | Broadwin et al. ............. | 725/37 |
| 6,311,197 B2 | 10/2001 | Mighdoll et al. | |
| 6,317,885 B1 | 11/2001 | Fries | |
| 6,338,094 B1 | 1/2002 | Scott et al. | |
| 6,392,664 B1 | 5/2002 | White et al. | |
| 6,470,378 B1 | 10/2002 | Tracton et al. | |
| 6,477,562 B2 * | 11/2002 | Nemirovsky et al. ......... | 718/108 |
| 6,502,243 B1 | 12/2002 | Thomas | |
| 6,519,415 B1 * | 2/2003 | Kim et al. ..................... | 386/246 |

(Continued)

FOREIGN PATENT DOCUMENTS

EP 0837599 4/1998

(Continued)

OTHER PUBLICATIONS

Office Action for U.S. Appl. No. 12/023,625, mailed on Apr. 28, 2011, Edward A. Ludvig, "Systems and Methods for Dynamic Conversion of Web Content to an Interactive Walled Garden Program".

*Primary Examiner* — Pankaj Kumar
*Assistant Examiner* — Mulugeta Mengesha
(74) *Attorney, Agent, or Firm* — Lee & Hayes, PLLC (57) ABSTRACT

Systems and methods to dynamically convert Web content to an interactive program for display on resource constrained television clients are described. In particular, a head-end server in a digital television entertainment system downloads the Web content from an external data source. The head-end server dynamically transcodes the downloaded content into an interactive walled garden program (iWGP) that includes MPEG stills and metadata for delivery to a client in the television entertainment system.

19 Claims, 6 Drawing Sheets

U.S. PATENT DOCUMENTS

| | | | |
|---|---|---|---|
| 6,526,575 B1 | 2/2003 | McCoy et al. | |
| 6,732,179 B1 * | 5/2004 | Brown et al. | 709/229 |
| 6,792,615 B1 * | 9/2004 | Rowe et al. | 725/37 |
| 6,944,228 B1 | 9/2005 | Dakss et al. | |
| 6,956,971 B1 * | 10/2005 | Cho et al. | 382/236 |
| 6,986,159 B1 | 1/2006 | Shimoji et al. | |
| 7,111,316 B1 | 9/2006 | Zahorjan et al. | |
| 7,143,347 B2 | 11/2006 | Su | |
| 7,143,433 B1 | 11/2006 | Duan et al. | |
| 7,240,358 B2 | 7/2007 | Horn et al. | |
| 7,305,698 B1 * | 12/2007 | Tanigawa et al. | 725/135 |
| 7,406,530 B2 * | 7/2008 | Brown et al. | 709/229 |
| 7,506,355 B2 * | 3/2009 | Ludvig et al. | 725/112 |
| 7,861,275 B1 * | 12/2010 | Vellaikal et al. | 725/109 |
| 2001/0018695 A1 | 8/2001 | Sequeira | |
| 2001/0026592 A1 * | 10/2001 | Moutin | 375/240.28 |
| 2002/0026642 A1 * | 2/2002 | Augenbraun et al. | 725/109 |
| 2002/0026645 A1 | 2/2002 | Son et al. | |
| 2002/0035728 A1 | 3/2002 | Fries | |
| 2002/0059644 A1 | 5/2002 | Andrade et al. | |
| 2002/0083469 A1 | 6/2002 | Jeannin et al. | |
| 2002/0138831 A1 | 9/2002 | Wachtfogel et al. | |
| 2002/0138848 A1 * | 9/2002 | Alao et al. | 725/109 |
| 2002/0168009 A1 * | 11/2002 | Sakaguchi | 375/240.16 |
| 2003/0056218 A1 * | 3/2003 | Wingard et al. | 725/46 |
| 2003/0065645 A1 * | 4/2003 | Itoh et al. | 707/1 |
| 2003/0070170 A1 * | 4/2003 | Lennon | 725/51 |
| 2003/0084440 A1 | 5/2003 | Lownes | |
| 2003/0126608 A1 * | 7/2003 | Safadi et al. | 725/89 |
| 2003/0172381 A1 | 9/2003 | Janevski | |
| 2003/0182429 A1 * | 9/2003 | Jagels | 709/227 |
| 2003/0233451 A1 | 12/2003 | Ludvig et al. | |
| 2004/0019900 A1 * | 1/2004 | Knightbridge et al. | 725/23 |
| 2004/0205596 A1 | 10/2004 | Sequeira | |
| 2005/0026645 A1 | 2/2005 | Yamamoto | |
| 2006/0117340 A1 * | 6/2006 | Pavlovskaia et al. | 725/34 |
| 2007/065109 A1 | 3/2007 | Kim et al. | |

FOREIGN PATENT DOCUMENTS

| | | |
|---|---|---|
| WO | WO0163806 | 8/2001 |
| WO | WO0178390 | 10/2001 |

* cited by examiner

EXEMPLARY IMPEG BACKGROUND IMAGE PRESENTED ON VIDEO PLANE 300

IMAGES OF LEFT AND RIGHT BUTTON CONTROLS

Fig. 3

EXEMPLARY METADATA PRESENTED ON OSD 400

OUTLINE OF CURSOR OVER DEFAULT BUTTON THAT HAS FOCUS

Fig. 7

SYSTEMS AND METHODS FOR DYNAMIC CONVERSION OF WEB CONTENT TO AN INTERACTIVE WALLED GARDEN PROGRAM

This non-provisional U.S. patent application is a divisional of and claims the benefit of priority to U.S. patent application Ser. No. 10/262,325, filed on Sep. 30, 2002, the disclosure of which is incorporated by reference herein.

RELATED APPLICATIONS

This patent application is related to the following U.S. patent applications:
  U.S. Pat. No. 7,216,170, titled "Systems and Methods to Reference Resources in a Television-Based Entertainment System", filed on May 22, 2002, and hereby incorporated by reference; and
  U.S. application Ser. No. 10/262,030, titled "Systems and Methods for Generating a Walled Garden Program for Substantially Optimized Bandwidth Delivery", filed on Sep. 30, 2002, and hereby incorporated by reference.

TECHNICAL FIELD

The following arrangements and procedures relate to generation and delivery of content to clients in a digital network.

BACKGROUND

Existing techniques to broadcast originally Web-based content to viewers in a television entertainment network are substantially limited in that they typically require WWW content providers to engage in substantial efforts to convert the originally Web-based content into a data format that is compatible with one or more particular cable broadcast servers, clients, and/or transport implementations. This means that the WWW content providers must not only design Web-based content for proper display within constraints of various implementations of television appliances, but must also utilize various tools and pre-existing knowledge to generate content that may be compatible with a particular head-end's specific server and/or transport implementations so that a respective head-end can broadcast the content to viewers. Such design and transformation activities are generally labor intensive and time consuming. Note, these design and transformation activities must be performed by the WWW content provider prior to transferring any information (i.e., Web content that has been converted by WWW content providers into a different data format for broadcast to subscribers) to a cable head-end for subsequent distribution to viewers.

The following systems and methods address these and other limitations of conventional systems and techniques to create content for delivery to networked clients.

SUMMARY

Systems and methods to dynamically convert Web content to an interactive program for display on digital television network clients are described. In particular, a cable head-end server in a digital television entertainment system downloads Web content from an external data source (e.g., a Web server serving walled garden content in HTML data format). The head-end server dynamically transcodes the downloaded source content into an interactive walled garden program (iWGP). The iWGP includes MPEG stills and metadata for delivery to a client in the television entertainment system. The metadata describes an interaction model corresponding for the MPEG stills.

BRIEF DESCRIPTION OF THE DRAWINGS

The same numbers are used throughout the drawings to reference like features and components.

DETAILED DESCRIPTION

Overview

The Information Service (IS) architecture described below supports many types of ITV services, such as WWW walled garden applications, Electronic Program Guide (EPG) services, VOD navigator applications, and so on. A basic feature of the described IS architecture is the ability for a cable head-end to download walled garden Web source content for dynamic transcoding into an interactive walled garden program (iWGP). The iWGP does not require a Web browser for presentation by a receiving client. The program is interactive because along a stream of MPEG still images, or image pages, the program includes corresponding metadata that provides an interaction model for a user to navigate the MPEG still images from the client.

For instance, conveyed metadata describes links (i.e., a URL) to other image page content, links to one or more applications hosted by the client, and/or focus areas to access a limited set of side effects and actions. A cable user (subscriber) can select and activate links/focus areas corresponding to an image page with an input device such as a hand-held remote control, thereby interacting with pages of information displayed by the thin client onto a display screen.

Since Web source content transcoded by the cable head-end into an iWGP can be presented and navigated by users of digital television clients, the client does not require a Web browser to view information that corresponds to the Web content. In this manner, client processing and/or data storage resource dependencies that would otherwise be needed to view Web content with a Web source content browser are essentially unnecessary.

An Exemplary Information Service

Figure 1:
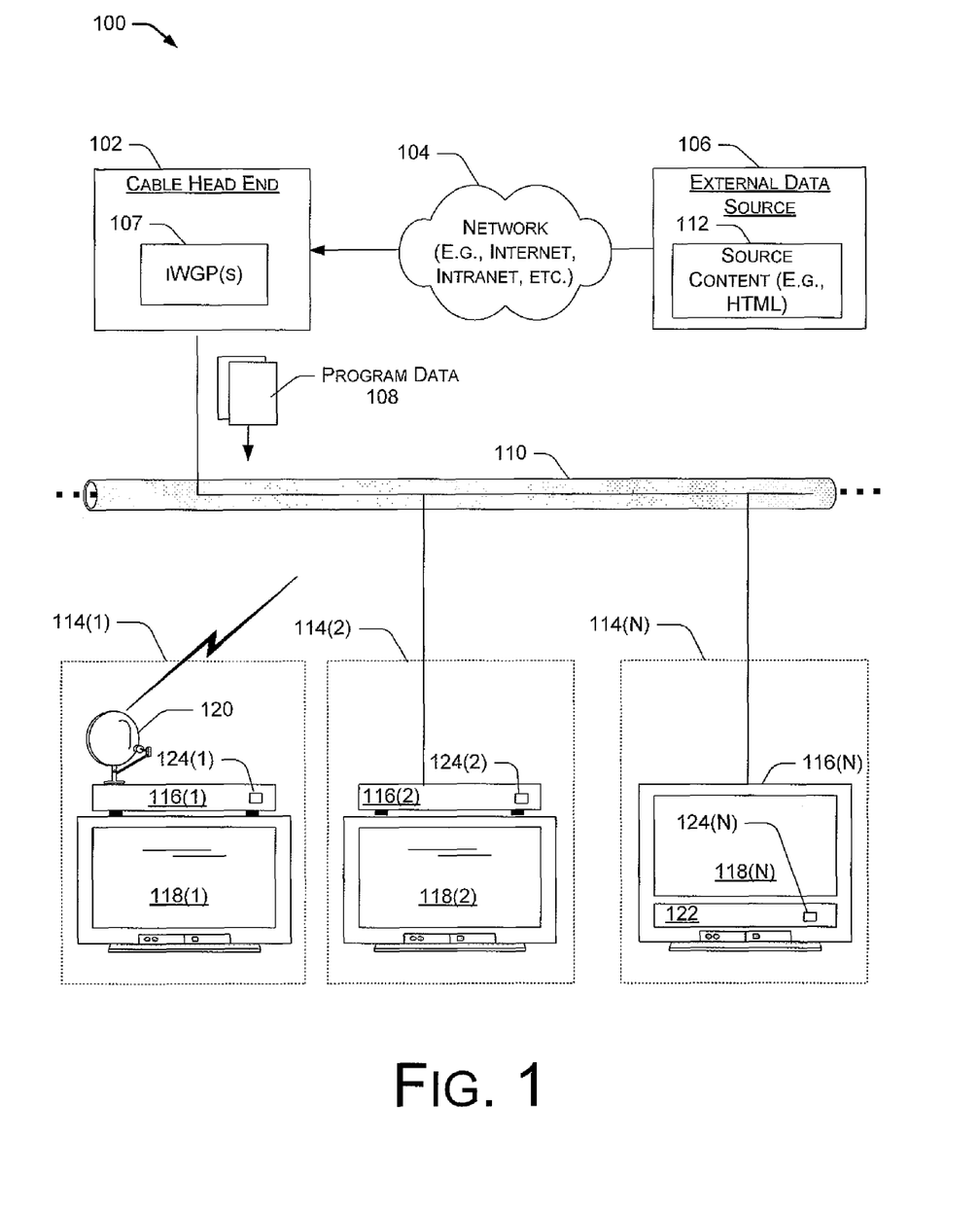
FIG. 1 shows an exemplary information service system to support many types of ITV services, such as WWW walled garden applications, Electronic Program Guide (EPG) services, VOD navigator applications, etc. A feature of the system is that a cable head-end dynamically converts downloaded Web content into broadcast-ready-data for delivery to digital television network clients.

FIG. 1 shows an exemplary information service system to convert downloaded Web content into an "interact walled garden program" (iWGP) that can be presented and navigated by clients in a digital television network. In general, head-end 102 directly interfaces with one or more external data sources 104 to fetch and receive source content 112 over network 106. External data source(s) 104 distribute the source content to facilitate ITV functionality of information service 100. To this end, external data source(s) 104 represent a Web server and any number of other types of network servers such as an EPG server, a VOD server, and so on.

Source content 112 represents walled garden Web content such as that formatted in Hypertext Markup Language (HTML). For purposes of this discussion, source content 112 further includes dynamic HTML (DHTML) content. DHTML, as is known, may include combinations of Java applets, JSCripts and JavaScript, Flash animation, marquees, META-tag refreshes, and so on.

Source content 112 is authored using standard and well known HTML creation tools, such as provided in an HTML-ready authoring program. The number of fonts and languages that may be represented by source content 112 is virtually unlimited. Head-end 102 downloads and transcodes the source content into an iWGP that conforms to represented font(s) and language(s) as a function of the particular font and/or language packs that are installed at the particular head-end 102.

Source content 112 may be authored to reference a limited or closed set of resources such as those presented via a walled garden Web site. For instance, although the walled garden may reference source content deployed by more than a single Web site (e.g., content may reference a weather service web site, a sports service web site, a news headlines web site, etc.), walled garden content does not reference resources that are outside of the walled garden. This constrains user navigation to predetermined boundaries, providing transitive closure that is in contrast to an open set of resources, wherein there is no such closure. Source content may also reference content that does not provide such transitive closure, for example, by referencing a co-hosted application on the target-set top box 116. This is accomplished via an embedded intrinsic event handler. These and other aspects of authored Source content 112 are described in greater detail below.

Head-end 102 dynamically converts downloaded source content 112 representing a single walled garden Web site into a single iWGP 107 for substantially optimized broadcast delivery as program data 108 onto coaxial cable transmission medium 110. The transmitted signals are received at one or multiple subscriber locations 114(1)-114(N). At least one of the subscriber locations, such as the location 114(1), includes a digital set-top box 116(1) or the like, equipped to convert the transmitted signals into signals capable of being received by a standard (e.g., NTSC) television set 118(1) for displaying video images and/or outputting audio to a subscriber/user.

Set-top boxes 116 can be implemented in a number of different ways. For example, set-top box 116(1) receives broadcast content from a satellite-based transmitter via satellite dish 120. Set-top box 116(1) is coupled to the television 118(1) for presenting content (e.g., audio data and video data) received by the set-top box, as well as a graphical user interface. Set-top box 116(2) is coupled to receive broadcast content from a broadcast network, represented herein as coaxial cable 110, and provide the received content to associated television 118(2). Set-top box 116(N) is an example of a combination television 118(N) and integrated set-top box 122. In this example, the various components and functionality of the set-top box are incorporated into the television, rather than using two separate devices. The set-top box incorporated into the television may receive broadcast signals via a satellite dish (similar to satellite dish 120 via coaxial cable 110, and or terrestrial digital).

Each set-top box 116 is coupled to any number of televisions 118 and/or similar devices that are implemented to display or otherwise render content. Similarly, any number of set-top boxes 116 can be coupled to a television 118.

Although system 100 represents a broadcast network with coaxial cable 110 as the physical transmission medium, the head-end 102 can alternatively broadcast signals to client devices (e.g., set-top boxes 116) over different transmission media. For instance, the head-end 102 can alternatively broadcast signals to client devices via wireless means such as so-called "wireless cable" broadcasts, digital satellite communication, etc.

An Exemplary Head-End

Figure 2:
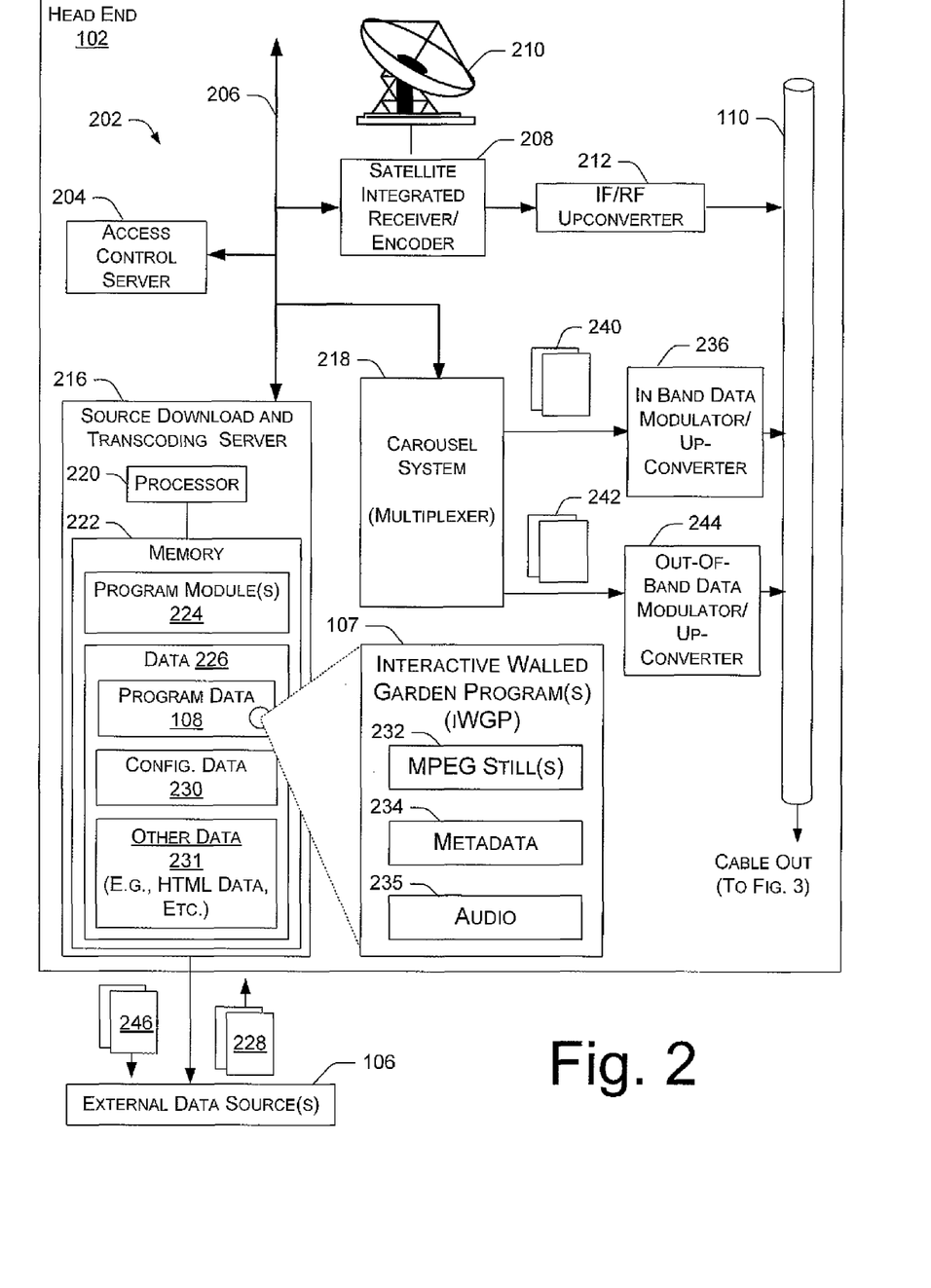
FIG. 2 shows exemplary aspects of the head-end of FIG. 1 in more detail.

As shown in more detail in FIG. 2, head-end 102 contains head-end local area network (LAN) 202, including an access control server 204 for controlling the operation of the head-end 102 over communication path 206 (e.g., an Intranet implementing Ethernet) to the various components therein.

A satellite integrated receiver/encoder 208, receives and encodes digital television programming signals such as originating from microwave broadcasts received via satellite antenna (dish) 210. One such receiver/encoder 208 outputs twenty-seven megabits per second (27 Mb/s) MPEG2 transport streams modulated onto a forty-four megahertz intermediate frequency carrier. In turn, the MPEG2-encoded transport streams are received by an intermediate frequency to radio frequency (IF/RF) up-converter 212.

The frequency up-converter 212 modulates the MPEG2-encoded transport streams onto six megahertz analog channels and injects the signals onto the broadcast network, which in this implementation is illustrated as cable transmission medium 110. By multiplexing multiple, packetized digital signals per six megahertz analog channel, hundreds of digital channels may be injected onto a single coaxial medium.

The Source Download/Transcode Server

In addition to broadcasting conventional television programming, head-end 102, and more particularly the source download/transcode server 216, downloads and dynamically converts source content 112 representing a walled garden into an iWPG for substantially optimized bandwidth utilization during delivery to set-top box(es) 116. Server 216 downloads source content 112 (FIG. 1) from one or more external data sources 104. The server may rely on Internet, intranet, and/or Virtual Private Network (VPN) access (e.g., via a local provider) from within the headend to fetch and receive the source content. (Hereinafter, the source download/transcode server 216 is often referred to as the "server", "download server", "transcode server", "iWPG Server", and so on, each name being representative of the particular functionality that is being discussed at the time.)

The process of converting downloaded source content 112 into an iWPG 107 is called transcoding. Because transcoding is performed at the head-end 102, source content author(s) do not need pre-existing knowledge of the data transport infrastructures of a head-end or the target clients 116. This is substantially beneficial because a source content author can create a single instance of source content for distribution to any number of different head-ends and clients with out needing such pre-existing device implementation knowledge. This means that a single instance of authored source content 112 can be dynamically converted, by any number of head-ends 102, to iWGP 107 for delivery to any number of clients, regardless of whether the respective head-ends utilize different respective server, client, and/or digital signal transport infrastructures.

The download server/transcoder component 216 is coupled across communication path 206 (e.g., Ethernet) to local head-end LAN 202. Download/transcode server 216 includes processor 220 coupled to memory 222. The memory includes volatile (i.e., random access memory (RAM)) and/or non-volatile memory. The memory comprises one or more program modules 224 and data 226. Processor 220 is configured to fetch and execute computer program instructions from program modules 224 (applications portion) of the memory, and further configured to fetch data from data 226 portion of the memory while executing the program modules.

Program modules 224 typically include routines, programs, objects, components, and so on, for performing particular tasks or implementing particular abstract data types. In this implementation, program modules 224 provide a run-time environment (i.e., an operating system) and perform the following described operations to fetch source content 112 from external data source(s) 104 and dynamically generate iWGP(s) 107 from the fetched content for substantially optimized broadcast distribution to subscribers 114. In particular, source content 112 is fetched, or downloaded as one or more electronic files 228 from external data source(s) 106. For purposes of illustration, these electronic source content downloads are represented within server 216 as "other data" 231.

Manually or via a scripting file (not shown), a system or program administrator establishes and deploys infrastructure for use by program module(s) 224 to: (a) download source content 112 as one or more electronic files 228; (b) generate corresponding iWGP(s) 107 from the downloaded source content; and (c) deliver the generated iWGP(s) to subscribers 114. Configuration data 230 includes such infrastructure.

Server 216 includes configuration data 230, which specifies at least a home page or root of a resource tree via a Universal Resource Identifier (URI) indicating a name and address of source content 112. The URI may further include, for example, localization parameters such as head-end identifier/name, zip code and so on, as provided by a program administrator. Configuration data 230 may include other data such as a periodicity to indicate a frequency for the server 216 to fetch source content 112 from a particular URI, targeting information (e.g., a media service organization (MSO) name and headend name), etc.

To facilitate server 216 transcoding of fetched source content 112, the configuration data 230, for each URL identifying source content 112, further indicates at least a portion of the following:
- an iWGP name such as a textual descriptor for the program that is a substantially unique identifier.
- a program application ID, which may be in the format OrgID.AppID, where the OrgID represents an organization ID assigned by Digital Video Broadcast, and the AppID represents an application ID that is assigned by the organization. The program application ID is used to populate a look-up file used by the client to identify the digital service on which the iWGP will be broadcast.
- a source capture rate, which is the refresh rate used to fetch source content 112 from the site deploying the source content.
- a program transport rate, which is the overall transport rate (bandwidth) allocated to an iWGP 107 (e.g., in units of bits/second). In one implementation, a default program transport rate is used.
- a parental control rating, which is a TV rating parental control setting (e.g., TV-Y7|TV-Y|TV-G|TV-PG|TV-14|TV-MA) that is applied by the download/transcode server 216 to an entire iWGP 107. The parental control rating overrides any settings that may be indicated by source content 112 or by a site deploying the source content.
- a program number (i.e., a service number) such as an MPEG number used to identify the digital service on which an iWGP 107 is to be broadcast. In the case of a Motorola cable system, this program number is used to populate a Virtual Channel Map used by the set-top box 116 as a look-up from a virtual channel number (VCN).
- a program broadcast frequency or EIA channel (e.g., set on up-converter(s) 236, 244). This configuration parameter indicates the frequency at which the iWGP 107 is to be broadcast by the head-end 102. In the case of a Motorola cable system; this value is used to populate the VCM on the Digital Audio Converter (DAC) as the look-up from the VCN).

An Exemplary Interactive Walled Garden Program (iWGP)

Source content 112 is downloaded or fetched by downloading and transcode server 216 as one or more electronic data files 228. The download/transcode server 216 downloads the source content from an external data source 104 identified by a URL according to one or more of the discussed parameters in the configuration data 230. The download source content is dynamically transcoded upon receipt, into iWGP(s) 107, each of which respectively represents broadcast ready content. In one implementation, such transcoding is performed by one or more Microsoft® Internet Explorer Active-X plug-in controls, thereby rendering fetched source content into an iWGP 107.

Each iWGP 107 is a navigable page tree that includes one or more MPEG stills 232, which are the visual portions of a page, a metadata component 234, and optional audio component 235. Each of these aspects is now described.

An Exemplary MPEG Still

Figure 5:
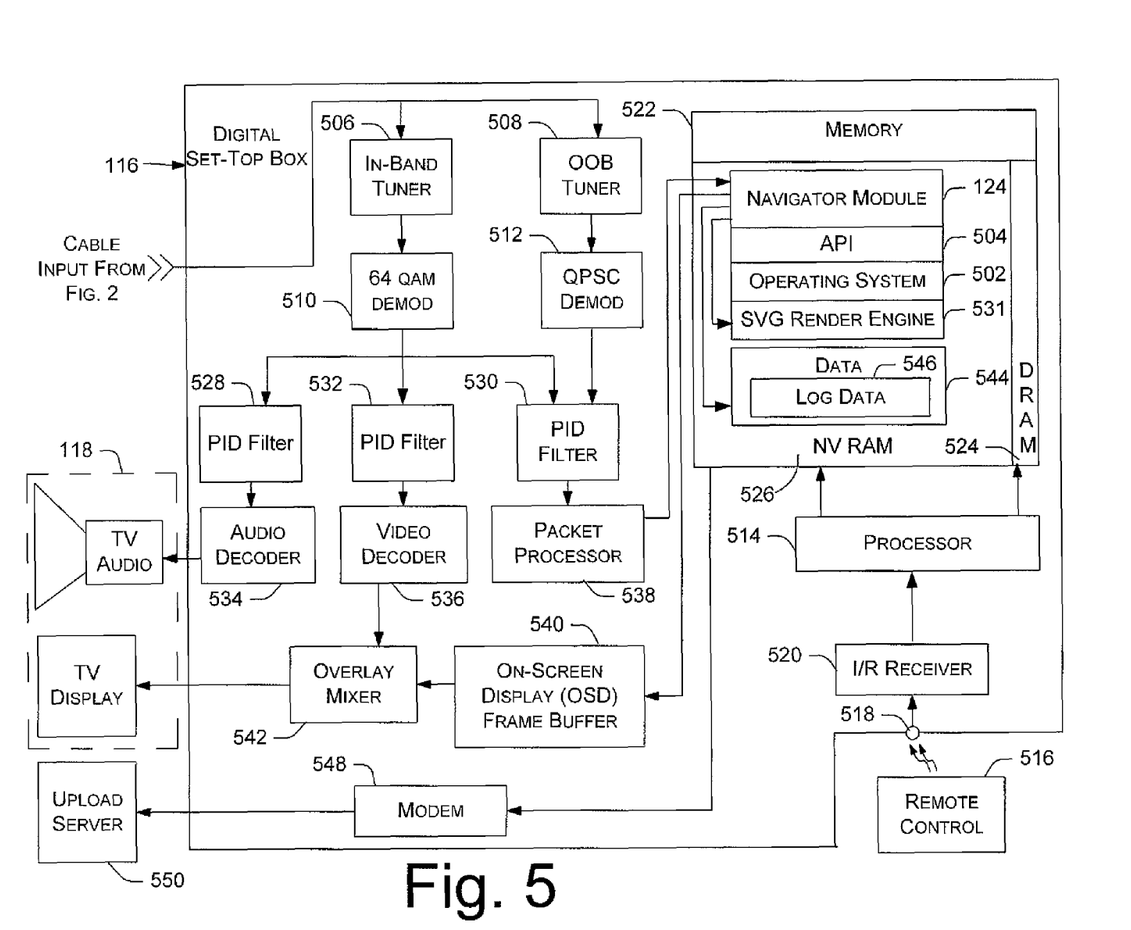
FIG. 5 shows exemplary aspects of a set-top box used at the subscriber end of the system of FIG. 1.

Each video still 232 generated by transcode server 216 is a single intra encoded MPEG2 picture (still) wrapped in a packetized elementary stream layer (PES) per the MPEG specification ISO/IEC 13818-2 Video. Each page's video component (still) 232 is assigned an exclusive Packet Identifier (PID) per the MPEG specification ISO/IEC 13818-1 Systems. Each MPEG video still 232 is capable of being decoded by an MPEG video decoder 536 in the set-top box 116 (FIG. 5).

The download/transcode server 216 generates the MPEG video 232 in compliance with US and European cable system standards using square pixel resolution parameters.

As noted above, source content 112, from which iWGP(s) 107 are generated, may be dynamic (i.e., dynamic HTML or a "DHTML" document), including any combination of Java applets, JScripts and JavaScript, Flash animation, marquees, META-tag refreshes, and so on. Although these elements can be used, the transcode server 116 does not guarantee that the dynamic aspects of fetched source content will be finished executing, or will have executed to any specific point before the server 116 generates a snapshot of the page (i.e., a single MPEG still 232). This is because a single still image effectively freezes the current state of the source content, regardless of whether dynamic content is executing. Accordingly, to represent dynamic content such as an animation loop within a source page 112, the transcode server 216 captures a series of snapshots of the same source content page, thus preserving substantial aspects of the dynamic character of the source content.

Picture quality attributes for an MPEG still 232 are indicated with a meta-tag in corresponding metadata 234. The quality attribute impacts picture quality of a corresponding MPEG still 232 as it is displayed at the client 114. For instance, image pages may be assigned one of three levels of quality, including, high, medium, or low. These quality designations are mapped to respective minimum quantization or compression values. The minimum quantization value indicates the degree of compression applied by the download/transcode server 216 to MPEG still 232, which is dynamically transcoded from Web content by the server 216. The degree of quanitization/compression affects the page size, which has a resultant effect on the average page size in an iWGP 107. Picture quality attributes specified by an author of source content 112 are parsed during programmatic generation of corresponding iWGP content by the server 216.

In one implementation, an exemplary image quality indications map: (a) HI quality pages to a minimum quantization of two; MED quality pages to a minimum quantization of eight; and LOW quality pages to a minimum quantization of sixteen.

There is a direct correlation between quality and the number of bits used to encode a still 232. In general, reducing a page's quality reduces its bandwidth requirement. An iWGP 107 can be edited by a system or program administrator or the transcode server 216 (i.e., programmatically) at the head-end 102 to override and/or initially assign MPEG content picture quality attributes. For example, page quality may be adjusted automatically during transcoding to accommodate any bandwidth constraints configured for the iWGP 107 (e.g., as indicated by configuration data 230). In this implementation, all pages within a source content 112 are transcoded assuming default quality unless otherwise specified by a quality attribute.

An iWGP 107 can be edited to add/remove image pages 232, corresponding metadata 234, audio 235, and so on. Related to the addition and removal of content from an iWGP 107 is the concept of MPEG still 232 priority. A page image's priority attribute affects acquisition latency of the page image at the client 114. To reduce acquisition latency, multiple instances of a frequently accessed page can be added by the program administrator (i.e., manually or automatically via configuration data 230) to the transport carousel system 218 at spaced-apart locations. Such page image redundancy reduces the latency for that page by increasing its frequency on the carousel. The priority assigned to a particular still 232 determines the frequency with which the page appears in the carousel 218. The carousel frequency divides the latency for that page.

At scheduled intervals, the download server 216 may iteratively download source content 112 from a particular external data source 104 to synchronize or refresh a corresponding iWGP 107 so that it reflects current or updated content for subsequent broadcast publication. It is possible for the page image to be updated at a frequency equal to the maximum initial latency of the carousel 218.

iWGP Metadata

Metadata 234 describes structure of a tree (i.e., links between iWGP pages) and contents of a corresponding MPEG still 232, or page image as well as an interaction model for the page image. The transcode server 216 determines the structure of downloaded source content 112 from the HTML Document Object Model (DOM), which is indicated by the downloaded source content 112. In particular, the server 216 transcodes the structure of an HTML document by extracting the location and shape of hot-spots by searching a page's DOM for anchor tags and client-side image maps. This hotspot or interaction model information is stored into the metadata 234 for the document.

The interaction model defined by metadata 234 provides for viewer interface with the digital set-top box 116 to selectively display the various page images 232 on the screen of the television set 118, access applications hosted by the set-top box 116, and so on. For example, a page image typically includes one or more selectable regions (hot-spots, buttons, etc.), a cursor that a viewer can move to focus on a particular region and select it (e.g., using an input device such as a remote control), and a set of responses mapped to the selectable regions. One or more of the mapped responses are triggered as a result of viewer selection of one of the selectable regions.

Figure 3:
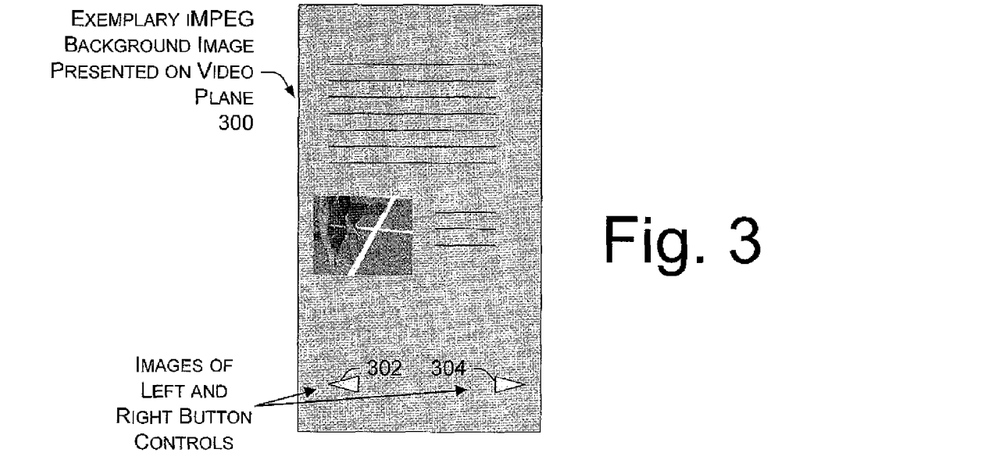
FIG. 3 shows an exemplary background image as it would appear when displayed by a client.

FIG. 3 shows an exemplary background image 300 as it would appear when displayed by a hardware video decoder on a set-top box 116. The background image 300 represents an MPEG still 232 to illustrate, among other things, two button controls 302 and 304. The metadata 234, or interface model of this example, identifies locations of hotspots on the page, identifies navigation links to other pages, and indicates response(s) to user inputs (e.g., highlighting underlying portions of the video plane) based on cursor position.

Figure 4:
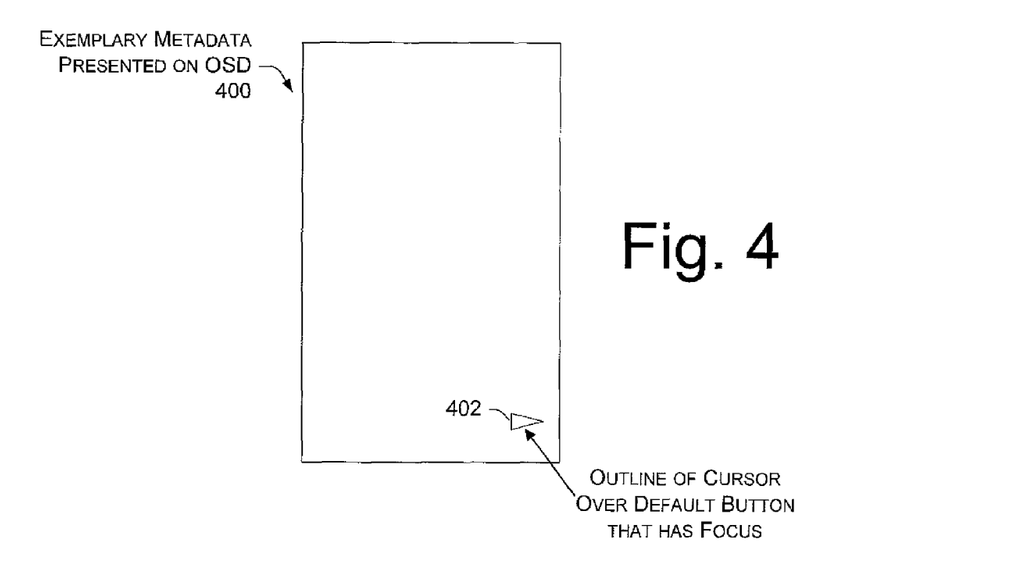
FIG. 4 shows an exemplary interaction model defined by metadata presented on an on-screen display (OSD) frame buffer of a set-top box.

FIG. 4 shows an exemplary interaction model 400 defined by metadata presented on an on-screen display frame buffer (OSD) of a set-top box 116. The OSD is capable of superimposing alphanumeric characters, other symbols and bitmap graphics over a displayed image.

In this example, the interaction model 400 of FIG. 4 displays an outline of a cursor 402 over the default hotspot (e.g., button) of the background image 300 of FIG. 3 that is has current focus. In this example, the default hotspot represents right button control 304. Through the interaction model, the set-top box 116 interface may respond to a button select action by invoking (linking) another interface page, by tuning the set-top to a specific broadcast feed, launch another application and relinquish set-top resources in the process (e.g., a button select may initiate a VOD session), and so on.

As discussed above, metadata 234 that define how focus should be drawn on links and form elements are inferred by the transcode server 216 from the source content 112 layout. Focus geometry is specified in a grid that corresponds to the source content capture resolution. In other words, even pixel addresses are used in focus specifications. The focus descriptors for each page element are combined with the other metadata for each page element.

Metadata 234 that indicate the name of the HTML source pages 112 associated with each link are inferred from the HTML source 112. One or more of these source pages may identify a background video component. The metadata defining the focus geometry and link URLs are encoded using standard client-side image map tags, e.g., <AREA>. The HREF attribute for entries relating to a form element focus will contain the URL specified by an ACTION attribute in the <FORM> tag. Appended to that URL is the form query string fragment defined by that form element The HREF attribute for hyperlinks contain the URL from the corresponding anchor or image map.

Hypertext links, specified by walled garden source content 112, are transcoded by server 216 to relative links stored in an iWGP's corresponding metadata documents 234. In one implementation, a relative link in one metadata document may specify an absolute path to another metadata document of the same iWGP program. In another implementation, the relative link in a particular iWGP metadata document may also reference a different iWGP, the relative link indicating a digital service corresponding to the different iWGP and target metadata for the different iWGP. In this implementation, the relative link can be used by a digital television entertainment system client to navigate from the particular iWGP to the different iWGP.

The absolute path specified by a relative link corresponds to a location on transport carousel system 218. For example, "./<path/targetFile.SVG>" represents a relative link to a file on the carousel 218. Hypertext links, specified by walled garden source content 112, that do not exhibit transitive closure (i.e., point outside of a walled garden), such as to another walled garden or application, are transcoded "as-is" in metadata 234. For example, in one implementation, a relative link is a Transport Stream (TS) Universal Resource Identifier Locator (URL). A TS URL is a resource referencing mechanism through which an iWGP hosted by a client device 116 can access virtually any type of resource that is accessible via a digital or analog tuner. Such resources include software and/or hardware resources.

As noted above, an intrinsic event handler may be embedded into the DOM of source content 112. An intrinsic event handler specifies one or more specific functions (exposed APIs) to invoke with respect to applications co-hosted on a target set-top box 116. For example, an intrinsic event handler may be used to invoke a VOD session from an iWGP 107 and initiate the play-back of a specific VOD title. Specific syntax for a script portion of an intrinsic event handler corresponds to an exposed API of the co-hosted application, an example is: <META http-equiv="Content-Script-Type" Content="text/Basic1_0">.

By way of further examples: (a) a VOD session launch is made responsive to a subscriber click on an anchor tag corresponding to <A onclick="VOD.Buy('Some Movie Name')"> metadata; (b) a force tune to a broadcast channel from an MPEG still 232 can be made when an anchor corresponding to <A onclick="TVAPI.Tune('ts://<TSI>')"> metadata is selected by a user ("ts" is a locator for a particular transport stream and "TSI" represents an index to resource and channel); (c) responsive to loading a "Body" tag, or on "Frameset" tag, such as when a ticker application is launched from an MPEG still as the still is loaded with the following syntax <BODY onload="Ticker.Stocks('MSFT', 'OPTV', 'MOTO')">

Although metadata 234 may be represented in any of a number of different data formats, this implementation generates metadata 234 in a Scalable Vector Graphics (SVG) data format The SVG data format is a vector graphics language written in Extensible Markup Language (XML). SVG metadata for the example of FIG. 4 is based, for example, on the following structure and content:

---

EXEMPLARY METADATA STRUCTURE AND CONTENT

Page ID
Locator of background MPEG video page
Locator of audio track
Hotspot 1 //e.g., Cursor to draw over right arrow button on OSD
{
   link id, shape, size, position,
   tab-order, opacity
   Hyperlink to next SVG page (page metadata)
}
Hotspot 2 // e.g., Cursor to draw over left arrow button on OSD
{
   link id, shape, size, position,
   tab-order, opacity
   Hyperlink to previous SVG page

---

-continued

EXEMPLARY METADATA STRUCTURE AND CONTENT

}
// Hotspot ...
{
   ...
}
// Hotspot N
{
   ...
}

---

The page ID substantially uniquely identifies the page generated by the source download/transcode server 216. Within each page are one or more hotspot sections that encapsulate a respective link ID. Link IDs collectively identify each of the links in the page.

When metadata 234 is loaded for presentation of still(s) 232 of an iWGP 107, the following is an exemplary sequence of events performed by a client 116. The background MPEG video still 232 is presented on the video plane. The audio track is decoded and presented by the hardware audio decoder. An element of metadata 234 is the default hotspot that is in focus when the metadata document 234 is loaded. The default hotpot is outlined with a cursor drawn on the OSD on the video plane. When the user presses remote control buttons for "left". "right", "up" or "down", the outline of the cursor is drawn at a new position on the OSD overlaying the image of the hotspot that is now in focus; the tab order of the selection is determined by the explicit tab attributes specified for each hotspot.

iWGP Broadcast Delivery

After server 216 has downloaded and converted source content 112 into one or multiple iWGP(s) 107, the server delivers program(s) 107 to carousel system 218 for subsequent injection over broadcast network 110 to subscriber(s). Carousel system 218 produces a real-time carousel data stream for modulation onto a six or eight megahertz channel of transmission medium 110.

In this implementation, the carousel 218 of iWGP(s) 107 are delivered to a client set-top-box 116 as a standard MPEG2 transport stream, which is broadcast in-band over some number of MHz carrier. Each iWGP is mapped to a digital service in a transport stream. The carousel system 218 is a broadcast multiplexer that multiplexes iWGP(s) 107 over a single transport stream.

In one implementation, the in-band data modulator/up-converter 236 accepts 27 Mb/s transport streams from carousel and encodes and modulates those signals to a 238 MHz intermediate frequency. The up-converter component converts the 212 MHz intermediate signal to an RF signal and injects the RF signal into the cable system's transmission medium 110. In this manner, the 27 Mb/s MPEG2 transport streams containing iWGP(s) 107 generated by server 216 are modulated onto a six megahertz analog channel for reception by subscribers.

In another implementation, MPEG stills 232 are broadcast over the in-band channel and metadata 234 are delivered over an out-of-band channel. For instance, the stills are delivered to the set-top box 116 over an in-band channel as one or more electronic files 240, whereas corresponding metadata 234 is delivered to the set-top box 116 via an out-of-band channel as one or more electronic files 242. This alternate implementation, takes advantage of a second tuner on the client to cache metadata and thereby substantially reduce user navigation latency. To this end, carousel system 218 is coupled to an out-of-band data multiplexer/up-converter 244. The out-of-band data multiplexer/up-converter may also be used to communicate other information service-related data to the cable network.

Although FIG. 2 shows only one source download/transcode server 216 in head-end 102, two or more such servers may be installed in a head-end for purposes of increased reliability based on redundancy. Moreover, the downloading and transcoding operations performed by server 216 can be distributed across any number of computing devices, rather than being performed on a single server 216.

The Subscriber End

FIG. 5 shows exemplary digital set-top box 116 used at the subscriber end of system 100. Although not necessary to the invention, in this particular set-top box, the hardware is unmodified so that the existing base of publicly distributed set-top boxes may implement the Information Service without requiring upgrade servicing or replacement. However, to provide a service in accordance with the described arrangements and procedures to dynamically convert downloaded source content 112 to broadcast ready MPEG 107 program(s) for substantially optimized broadcast delivery to the set-top box, the operation of the box 116 is modified by additional software downloaded thereto. Such additional software includes iWGP Navigator module 124 (also shown in FIG. 1), which is a computer-program module that communicates with an operating system 502 of the box 116 by placing calls through an application programming interface (API) 504, as described in more detail below.

As shown in FIG. 5, the digital cable box 116 includes in-band tuner 506 and out-of-band tuner 508, along with respective demodulators 510 and 512. Microprocessor 514 controls the tuning operations of tuners 506 and 508 based on commands received from a subscriber via an input device such as a keypad or an infrared remote control device 516, as described below. To this end, set-top box 116 includes infrared sensor 518 connected to an infrared receiver 520, which provides the command signaling information to the microprocessor 514. Memory system 522 includes operating system 502 stored therein, and preferably comprises a combination of volatile dynamic RAM 524 and non-volatile RAM (NVRAM) 526.

In this implementation, iWGP content is broadcast across digital channels as MPEG transport packets onto a six megahertz analog channel. The set-top box 116 includes some number of packet identification (PID) filters, which in this example are three (3) filters 528-532, to extract the appropriate encoded data packets for an application selected digital channel. The audio, video, and metadata content corresponding the iWGP are each respectively encapsulated in transports packets assigned PIDs that are substantially unique within the scope of the transport stream. The digital service is associated via program specific information (PSI) to the metadata component, which in turn references the corresponding video and/or audio. One of the video and audio components may be declared in the PSI to supply a splash screen for presentation upon client tuning to the iWGP host digital service.

Based on the selected channel, microprocessor 514 writes an identification value to each PID filter 528-532, whereby the filters 528-532 pass only those packets corresponding to that value. As shown in FIG. 5, one of the PID filters, filter 528, provides the filtered packets to an audio decoder 534 which decodes the digital audio data 235 (encoded, for example, according to the AC3 format), while another PID filter 532 provides filtered MPEG still frame packets 232 to the video decoder 536.

In addition to line-level audio and video outputs, the resulting video signal may be output from the set-top box 116 with separate luminance and chrominance signals (SVHS format). Set-top box 116 may also contain a modulator (not shown) for combining the audio and video signals onto a modulated carrier channel such as channel 3 or 4, for compatibility with television sets not having separate audio and video inputs.

Third PID filter 530 is provided to extract in-band and out-of-band data such as metadata 234 associated with corresponding MPEG still frames 232. As described above, the metadata describes links to other MPEG stills, other set-top box 116 co-hosted applications (e.g., an electronic programming guide (EPG), a VOD, and/or other applications), along with data describing any number of side effects and actions. A user can select and activate the links with a hand-held remote control, thereby interacting with the pages of information displayed on the television screen or switching to the referenced application. Packet processor 538 handles those packets by communicating them to navigator 124.

In this implementation, wherein metadata 234 is represented in an SVG data format, iWGP Navigator 124 uses an SVG rendering engine 531 running on middleware to render a cursor on the set-top on-screen display frame buffer (OSD) over each hotspot on a displayed MPEG still 232. (Using meta-tags in source content 112, which is parsed by the transcode server 216 into metadata 234, an author is able to indicate cursor attributes to the iWGP Navigator 124 on a per page basis). OSD 540 is capable of superimposing alphanumeric characters, other symbols and bitmap graphics over a displayed image. To accomplish this superimposition, overlay 542 is provided to appropriately combine the video outputs of the video decoder 536 and the OSD 540.

Cable box 116 functions when the user provides an appropriate and valid command to the cable box. For example, in response to a digital channel selection command, the microprocessor tunes the in-band tuner 506 to an appropriate analog channel based on the digital channel selected by the subscriber. If a digital channel was selected, a table or the like stored in memory 522 determines the analog channel that carries the digital channel's packets, along with the packet identification numbers corresponding to that channel, for writing into PID filters 528 and 532. Once the PIDs have been written, audio and video decoders 536 and 534 will receive the appropriate packets and decode and output appropriate signals. As described below, some of the packets will include iWGP(s) 107 that have been dynamically generated at head-end 102.

Figure 6:
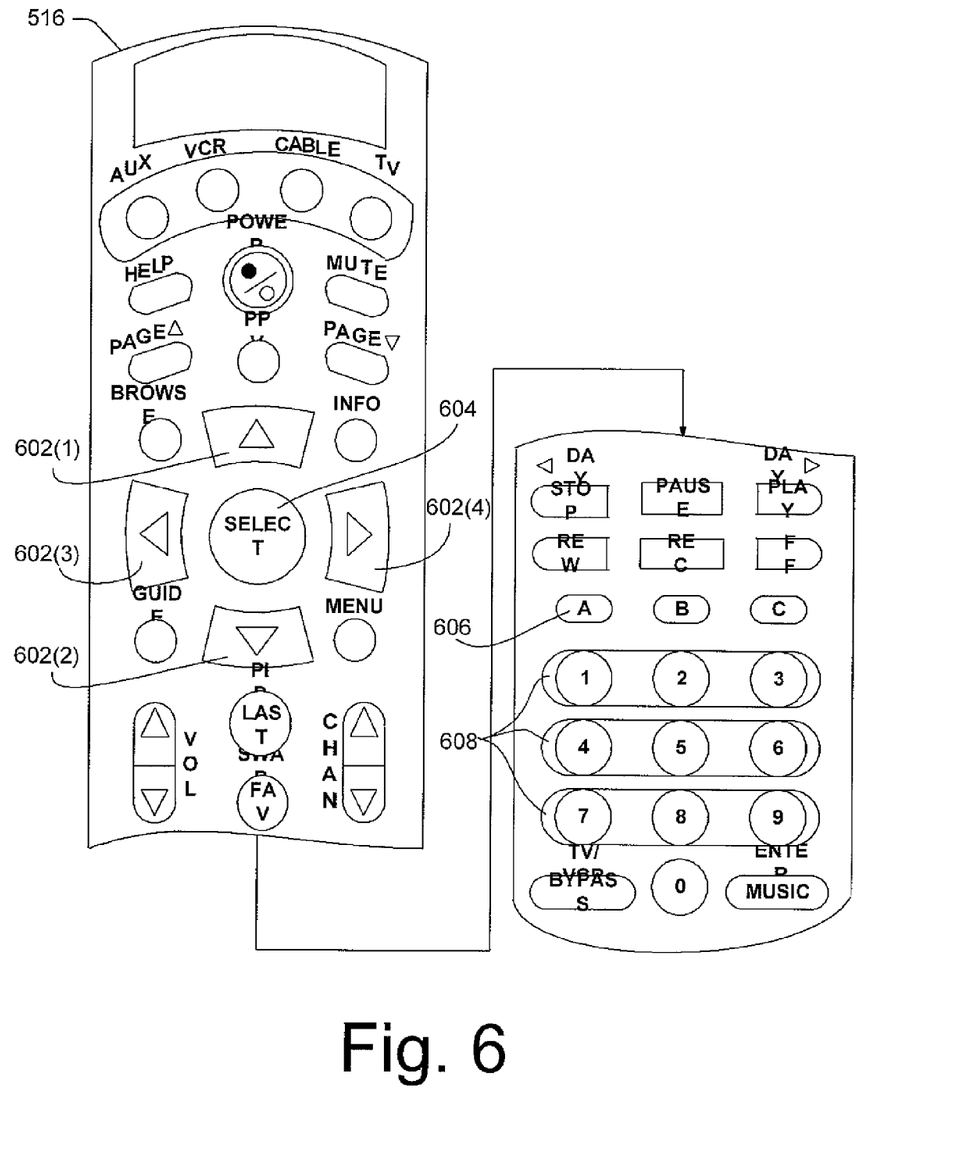
FIG. 6 shows client-side input device, such as an exemplary hand-held remote control.

FIG. 6 shows an exemplary client-side input device. The subscriber also will be provided with an input device such as hand-held remote control 516 of FIG. 6. In one implementation, the input device includes four directional (up, down, left and right cursor) buttons, 602(1)-602(4) respectively, and a "SELECT" button 604. The remote control 516 may include a dedicated button, chosen as the "A" button 606 of FIG. 6, which may be used to enter the information service in one alternative scenario described below. In one implementation, the remote control input device will also provide the normal complement of TV-related buttons including a numeric keypad 608, volume adjustment, channel adjustment, mute and so on. Other buttons such as those for control of a videocassette recorder also may be provided. The remote control is wireless, e.g., an infrared or RF-based remote control, but of course alternatively may be wired. Moreover, alternate input devices need not be remote, but may for example, be provided as a keypad (not shown) on a set-top box.

An Exemplary iWGP Navigator Module

A user or subscriber utilizes set-top box 116 to display, listen, and/or interact with cable data provided via head-end 102. In particular, the user utilizes set-top box 116 to display, listen, and/or interact with iWGP(s) 107 generated by head-end 102. To this end, iWGP navigator module 124 has been downloaded into memory 522 of set-top box 116, along with APIs 504 for interfacing the iWGP navigator module to operating system 502 of the set-top box.

In one scenario, when a subscriber tunes (e.g., via remote control 516) to a specified channel reserved for the Information Service of system 100 of FIG. 1, iWGP navigator 124 enables the subscriber to browse iWGP(s) 107 broadcast on the cable network. The user can launch the navigator from other co-hosted set-top applications, such as from a menu within the EPG. Once an iWGP is launched, the subscriber may navigate from one still 232 to another still 232 and from one program 107 to another program 107.

For instance, when the user presses a directional cursor button on input device 516 such as represented by buttons 602(1)-602(4), the navigator module 124 reads metadata 234 associated with the displayed MPEG still 232 to perform possible actions. Examples of some possible actions include adjusting focus, tabbing through links, hyperlinking to another MPEG still 232, hyperlinking from the navigator module 124 to another application (e.g., an EPG), etc.

Cable boxes typically provide APIs 504 to control the tuner and selection of program elements in the MPEG2 stream. iWPG navigator module 124 uses such an API (in the APIs 504) to specify the digital channel corresponding to the appropriate iWGP 107 on the carousel 218, whereby processor 514 in set-top box 116 tunes in-band tuner 506 to the appropriate carrier and selects the program (Service) corresponding to the desired page group. The mapping between digital channels and carousel page programs is fixed and may be mapped to virtual channels for selective control of user channel access. The iWPG navigator selects the program element (service component) containing the carousel page for display, and uses an API (or the like) to select the Video Program Element for display. As a result, the PID is written to PID filter 532 and the page image is decoded and displayed by the hardware.

iWPG navigator 124 selects the program component that carries metadata 234 for page group 107. Page metadata is organized in the carousel system. Each iWGP page has an associated metadata file. Cable boxes 116 may provide a carousel system client access to specific metadata files in the carousel. The iWPG navigator reads the page metadata, which includes a record for each hotlink on the page. Each hotlink record includes information such as the geometry of focus for that hot-spot and other information specific to the hot-spot.

For anchor elements, the record includes the file name of the target iWGP page metadata 232 to which the link refers. Note that the carousel 218 contents are described by the carousel metadata, which is carried in-band or out-of band. Where the hot-spot indicates a link to a page in a different iWGP, the record includes a reference to the particular digital service on which the target program is broadcast in addition to a metadata file name corresponding to the target page in the program.

After metadata 234 has been read by iWPG navigator 124, the iWPG navigator draws focus on a default link as specified by the page metadata. At this time, displayed still 232 is ready for user-interaction. For example, iWPG navigator draws focus on other links as they are tabbed to by the user, according to the focus chain specified in the page metadata. Accordingly, when the user moves focus to a hyperlink, the module 124 simply draws focus, using OSD 540, on some region of the screen as indicated by geometry information in page metadata. When the user selects the link, the iWPG navigator changes the display to the destination page as indicated by the link data in the former page's metadata.

An Exemplary Procedure

Figure 7:
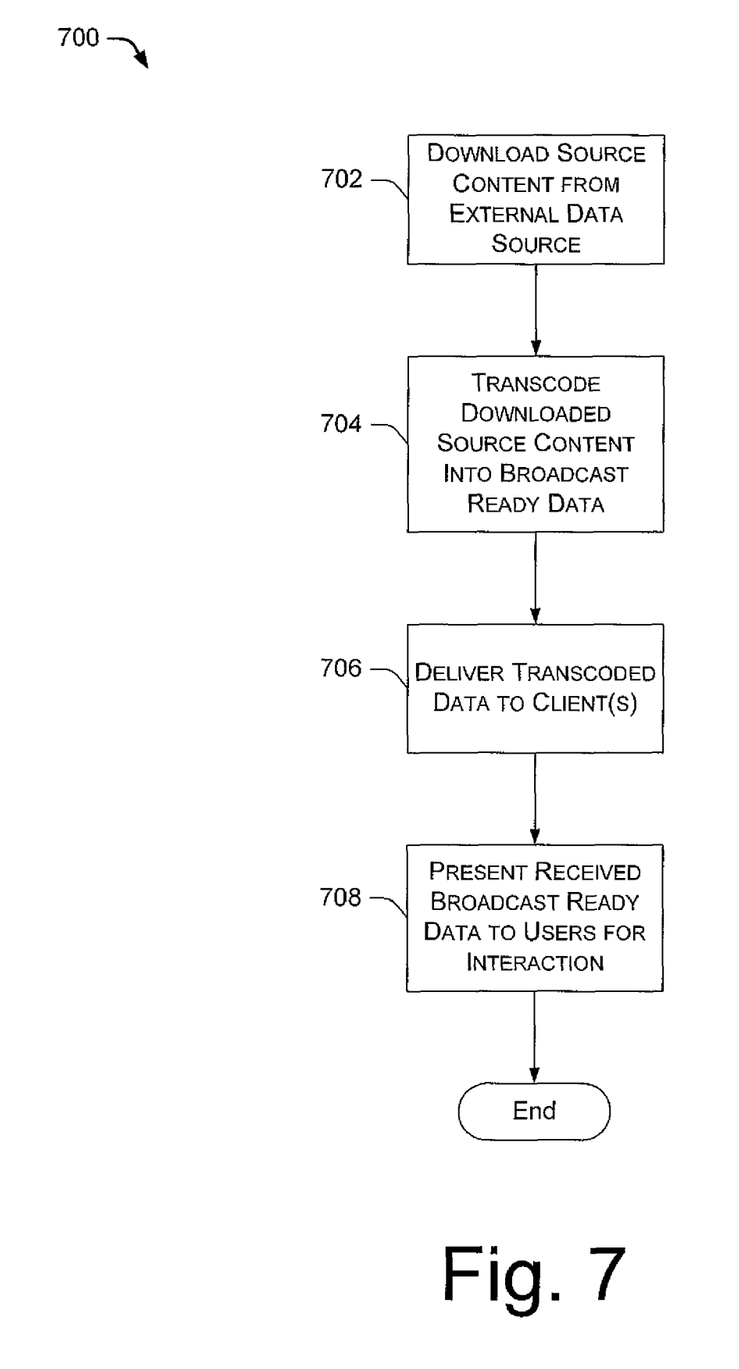
FIG. 7 shows an exemplary procedure to dynamically convert downloaded Web content into multiple MPEG stills and corresponding metadata for use by clients in a digital television network.

FIG. 7 shows an exemplary procedure 700 to dynamically convert downloaded Web content into programs that include MPEG stills that can be presented and navigated using metadata on clients in a digital television network. At block 702, server 216 actively gathers source content 112 from an external data source 104. As noted above, this data fetching operation is performed according to parameters indicated by configuration data 230. At block 704, server 216 transcodes the downloaded source content into an iWGP 107, comprising one or more still(s) 232, metadata 234, and optional audio 235 components. In one implementation, hereinafter referred to as a non-layering implementation, there is a one-to-one mapping between an MPEG still 232 and an interface page in the downloaded source content 112. That is, a single MPEG still 232 is generated from all background, image, and text components of a single interface page 112 (e.g., a Web page).

In other implementations, described in the following alternative implementations section, there is a many to one relationship between the numbers of MPEG stills 232 generated from a single interface page. That is, multiple MPEG stills 232 are generated to respectively represent various background, image, and possibly text components of a single interface page. In another implementation, text is extracted from background, and/or text layers of an interface page 112. The extracted text is not represented with an MPEG still, but rather embedded into metadata 234 for later rendering onto an OSD layer at the client 114.

At block 706, the head-end 102 delivers the transcoded source content as an iWGP 107 to one or more clients 114. At block 708, the iWGP navigator 124 presents received broadcast content 107 to users for interaction.

CONCLUSION

The described systems and methods provide for dynamic conversion of Web content to an interactive walled garden program for presentation by digital television network clients. Although the systems and methods have been described in language specific to structural features and methodological operations, the systems and methods as defined in the appended claims are not necessarily limited to the specific features or operations described. Rather, the specific features and operations are disclosed as exemplary forms of implementing the claimed subject matter.

The invention claimed is:

1. In a television entertainment infrastructure, a head-end server comprising:
    one or more processors;
    a memory;
    a data input component maintained in the memory and executed on the one or more processors to:
        identify an address corresponding to an external data source and source content, the source content being in an HTML data format; and
        download the source content from the external data source; and
    a conversion component maintained in the memory and executed on the one or more processors to:
        determine a structure of the source content based at least in part on a document object model, the structure of the source content being transcoded by extracting a location and a shape of hot-spots associated with the source content by searching the document object model for anchor tags and client-side image maps, the location and shape of the hot-spots being stored in metadata associated with the source content;

automatically convert the structure of the source content into an interactive walled garden program (iWGP), the iWGP being a navigable page tree that includes multiple MPEG stills and metadata for navigating the MPEG stills, the iWGP for broadcast delivery to a client in the television entertainment infrastructure; and add multiple instances of a more frequently accessed MPEG still of the multiple MPEG stills to a transport carousel at predetermined spaced-apart locations, a priority assigned to the more frequently accessed MPEG still determining a frequency with which the more frequently accessed MPEG still appears in the transport carousel.

2. A head-end server as recited in claim 1, wherein the source content exhibits transitive closure.

3. A head-end server as recited in claim 1, wherein the metadata includes a link to a different iWGP such that the client can be used to navigate from the iWGP to the different iWGP.

4. A head-end server as recited in claim 3, wherein the link indicates a digital service corresponding to the different iWGP and target metadata for the different iWGP.

5. A head-end server as recited in claim 1, wherein the client comprises a set-top box.

6. A head-end server as recited in claim 1, wherein the metadata describes structure and contents for an interaction model associated with the multiple MPEG stills.

7. A head-end server as recited in claim 1, wherein the conversion component communicates media service organization (MSO) and/or subscriber data to the external data source for use by the external data source to localize the source content.

8. A head-end server as recited in claim 1, wherein the conversion component generates a plurality of different stills over time from a single interface page of the source content, the interface page comprising attributes that change over time.

9. A head-end server as recited in claim 1, wherein the data input component configures the broadcast ready data to indicate a program name, an iWGP transport rate, a parental control rating, an identifier that maps a digital service to iWGP, an MPEG program number at which the iWGP is being broadcast, and/or a program broadcast frequency.

10. A head-end server as recited in claim 1, wherein the conversion component:
identifies a picture quality attribute; and
encodes a picture component from the source content into a still of the multiple MPEG stills such that the still is compressed according to the picture quality attribute.

11. A head-end server as recited in claim 1, wherein the data input component:
delivers video components of the iWGP to the client over an in-band communication channel; and
delivers metadata to the client over an in-band or out-of-band communication channel, the metadata corresponding to an interaction model for the video components.

12. A method comprising:
identifying, by a head-end server, an external data source and corresponding source content;
downloading the source content from the external data source;
determining a structure of the source content based at least in part on a document object model and transcoding the structure by extracting a location and a shape of hot-spots associated with the source content by searching the document object model for anchor tags or client-side image maps, the location and shape of the hot-spots being stored in metadata associated with the source content;
converting the source content into an interactive walled garden program (iWGP), the iWGP including a plurality of MPEG stills, metadata for navigating between the plurality of MPEG stills, and audio associated with the plurality of MPEG stills;
adding multiple instances of a particular one of the plurality of MPEG stills that is more frequently accessed than other MPEG stills to a transport carousel system; and
distancing the multiple instances of the MPEG still a predetermined space from each other in the transport carousel system.

13. A method as recited in claim 12, further comprising delivering the iWGP to a client in a television entertainment infrastructure.

14. A method as recited in claim 12, further comprising assigning a priority to the MPEG still, the priority determining a frequency with which the MPEG still will appear in the transport carousel system.

15. A method as recited in claim 12, further comprising editing the iWGP to add or remove content from the iWGP.

16. A system comprising:
a processor one or more processors;
a memory;
a data input component maintained in the memory and executed on the one or more processors to:
identifies an address corresponding to an external data source and source content, the source content being in an HTML data format; and
downloads the source content from the external data source; and
a conversion component maintained in the memory and executed on the one or more processors to:
determine a structure of the source content based at least in part on a document object model that is indicated by the source content, the structure of the source content being transcoded by extracting a location and a shape of hot-spots associated with the source content by searching the document object model for anchor tags and client-side image maps, the location and shape of the hot-spots being stored in metadata associated with the source content;
automatically convert the source content into an interactive walled garden program (iWGP), the iWGP being a navigable page tree that includes multiple MPEG stills, metadata for navigating the MPEG stills, and audio associated with the multiple MPEG stills, the iWGP being delivered to a client in the television entertainment infrastructure;
add multiple instances of a more frequently accessed MPEG still of the multiple MPEG stills to a transport carousel system at predetermined spaced-apart locations, a priority assigned to the more frequently accessed MPEG still determining a frequency with which the more frequently accessed MPEG still appears in the transport carousel system; and reduce a latency associated with the more frequently accessed MPEG still by increasing the frequency with which the more frequently accessed MPEG still appears in the transport carousel system and is delivered to one or more clients in the television entertainment infrastructure.

17. A system as recited in claim 16, wherein the more frequently accessed MPEG still is manually or automatically added to the transport carousel system.

18. A system as recited in claim 16, wherein the priority assigned to the more frequently accessed MPEG still corresponds to an acquisition latency of the more frequently accessed MPEG still.

19. A system as recited in claim 16, wherein the metadata includes a link to a different iWGP such that the client can be used to navigate from the iWGP to the different iWGP.

* * * * *